K. H. V. VON PORAT.
FEEDING DEVICE FOR PULVERULENT FUEL.
APPLICATION FILED MAY 4, 1916.

1,319,193.

Patented Oct. 21, 1919.

INVENTOR
Karl Hjalmar Vilhelm von Porat
by his attorneys

UNITED STATES PATENT OFFICE.

KARL HJALMAR VILHELM von PORAT, OF STOCKSUND, SWEDEN, ASSIGNOR TO MOTALA VERKSTADS NYA AKTIEBOLAG, OF MOTALA VERKSTAD, SWEDEN.

FEEDING DEVICE FOR PULVERULENT FUEL.

1,319,193.   Specification of Letters Patent.   Patented Oct. 21, 1919.

Application filed May 4, 1916. Serial No. 95,387.

*To all whom it may concern:*

Be it known that I, KARL HJALMAR VILHELM VON PORAT, engineer, a subject of the King of Sweden, residing at Stocksund, Sweden, have invented certain new and useful Improvements in Feeding Devices for Pulverulent Fuel, of which the following is a specification.

The present invention relates to such feeding devices for pulverulent fuel, in which the feeding is effected by an air or gas current, which acts on the powder, the feeding being controlled by increasing or reducing the size, speed or pressure of said air- or gas current. Simultaneously also the combustion air may be proportioned in proper relation to the powder, and this may be effected by adjusting the controlling organs for the air and powder feeding simultaneously, preferably by hand, whereby the fire is controlled as desired. In such furnaces, where the combustion air is sucked in by the draft in the furnace and this draft varies, as is the case in locomotives, the said simultaneous control of the air and powder feeding organs by hand is not sufficient to maintain the proper relations between the air and powder, because a greater or less quantity of combustion air is sucked in according to the strength of the draft. Thus also the powder feeding ought to be controlled in the same relation as the combustion air is sucked in, so that, after the powder and air feeding organs have been adjusted into a certain position, the both feedings are controlled automatically by the draft in the furnace.

As before mentioned the fuel feeding at the said organ can also be controlled by varying the quantity, speed or pressure of the air and gas current, which actuates the powder or passes through the organ and the powder conduit, and which air and gas current consequently ought to be made independent of the draft in the furnace, so that it varies in the same degree as the draft. This is effected in the most simple way by allowing the draft in the furnace to create directly the air current required for feeding the powder in the fuel conduit, that is the powder is sucked in by the draft in the furnace in the same manner as the combustion air.

In comparatively long fuel conduits or in conduits of relatively small diameter, where the draft in the furnace is not able to suck in the powder, the air current in the powder conduit can be assisted by an injector or the like, that is by suction, or by admitting pressure air, that is by pressure, in which case the arrangement preferably is such, in order to obtain variations in the air current in the powder conduit, corresponding to the draft in the furnace, that the controlling valve for the steam passing to the injector or the motor, which drives a blowing machine or a controlling damper in the air conduit, is actuated by the draft in the furnace or the means for causing the draft.

According to one embodiment of the invention the mouths of two conduits or series of conduits, the one admitting air or gas in the powder mass and the other carrying the powder to the furnace, submerge into the powder mass, the feeding being regulated by adjusting said mouths or by varying the pressure of the conveyed air- or gas current or by both these operations simultaneously.

In the accompanying drawings.

Figures 1, 2:
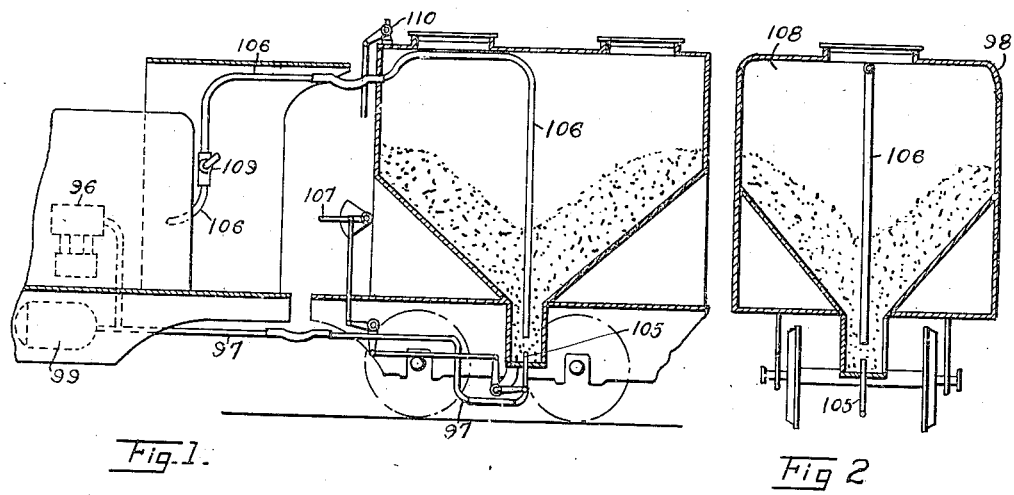
Figure 1 shows a side elevation partly in section, of a tender and the rear end of a locomotive, provided with a powder feeding device according to this invention.
Fig. 2 shows a cross section of the tender.

As shown in Figs. 1 and 2, the device for blowing the powder into the furnace consists of an air pump or blowing machine 96, in which an air conduit 97 extends to the lower part of the powder receptacle 98. The air conduit 97 may preferably be provided with a receiver 99, which serves as an air holder. The conduit 97 is provided with a mouth 105, which opens into the powder receptacle immediately below the lower open end of a tube conduit 106, which extends to the furnace. The air current coming from the mouth, whirls up the powder and mingles with the same, and the mixture thus obtained is blown into the furnace through the tube 106.

Figures 3, 4, 5:
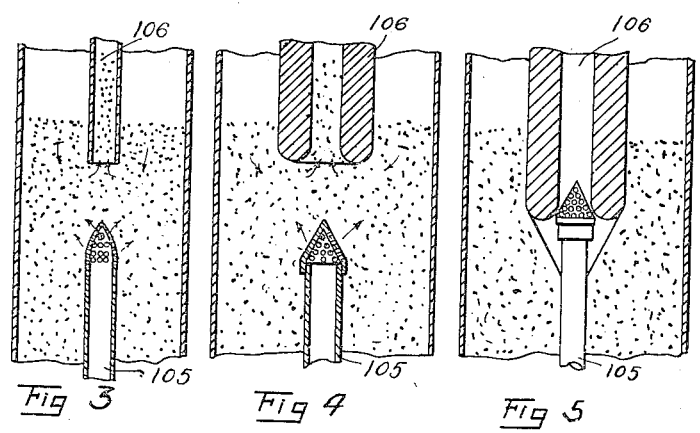
Figs. 3, 4 and 5 show details of the powder feeding apparatus.

The mouth 105 is at its upper end preferably provided with a number of small holes, so that the air current is divided in fine jets, whereby the loosening (whirling up) of the powder is increased. The mouth 105 is movably arranged in the bottom of the receptacle and is by means of a lever- and link mechanism, combined with a handle 107, so that the mouth can be moved to and from the lower mouth of the tube 106 and the powder supply thereby be controlled. The supply can be interrupted entirely by moving the mouth up against the lower end of the tube 106. which end is formed as a seat for the mouth, as shown in Fig. 5. The pressure air, which in this event does not bring any powder with itself, will clean the conduit 106, especially if the air current is made somewhat more powerful than during the powder feeding, which can be attained by allowing the air pump to operate with a greater speed.

Evidently all the air flowing from the mouth cannot continue to the tube 106, but a part of the air will pass along the inclined plate bottom, on which the powder rests and hence up to the chamber 108 above the powder, said chamber being air-tight so that the same pressure is existing there as between the mouth 105 and the end of the tube 106. On account of the air passing along the bottom carrying the powder mass the friction between the powder and the bottom is materially reduced, so that the powder will easily slide downward. If the powder is choked up in the receptacle, the conduit 106 is closed by means of the cock 109 and the air is blown out from the chamber 108 by opening a suitable pet cock simultaneously as the speed of the air pump 96 and thus also the air pressure is increased. Thereby the whole pulverulent mass is lifted and stirred so that loosened powder again runs down to the mouth of the tube 106.

Figs. 3 and 4 show different embodiments of the mouth and the lower end of the tube 106. The lower edge of this latter must, however, always be rounded for the purpose of preventing peat fibers from fastening on the edge.

What I claim is:

1. In a feeding device for pulverulent fuel, a powder receptacle, a fuel outlet pipe, a pipe for supplying a gaseous medium into the receptacle, said pipe extending from the outside of the receptacle through the wall to the interior thereof, the receiving mouth of said fuel outlet pipe being faced downward, said supply pipe having openings for causing the gaseous medium to flow outwardly in practically all lateral directions with respect to the axis of the delivering end of said pipe immediately before escaping together with a quantity of powder through the fuel outlet pipe, the discharge openings of the gas pipe being located at some distance above the bottom of receptacle, which latter is contracted downward and has the pipe ends located in the lower contracted part.

2. In a feeding device for pulverulent fuel, a powder receptacle, a fuel outlet pipe, a pipe for supplying a gaseous medium into the receptacle, said pipe extending from the outside of the receptacle through the wall to the interior thereof, means for preventing the fuel from falling by gravity into the fuel pipe outlet, the discharge end of the gas supply pipe being located below the receiving mouth of the fuel outlet pipe but projecting into the interior of the receptacle at some distance above the bottom of the receptacle and being provided with a plurality of fine holes distributed practically on all sides of the pipe, the walls of the receptacle converging downward and the pipe ends being located at the lower contracted part of receptacle.

3. In a feeding device for pulverulent fuel, a powder receptacle, a fuel outlet pipe, a pipe for supplying a gaseous medium into the receptacle, said pipe extending from the outside of the receptacle through the wall to the interior thereof, the receiving mouth of said fuel outlet pipe being faced downward, one of the adjacent ends of said two pipes being adjustably mounted by means of a handle mechanically connected with said adjustable end, the discharge end of the gas supply pipe being located below the receiving mouth of the fuel outlet pipe and being provided with a plurality of fine holes forming the outlet of the gas pipe, said perforated end being formed in such a way that in the one position of the adjustable pipe end both pipes are closed from communication with the receptacle.

4. In a feeding device for pulverulent fuel, a powder receptacle having its lower portion contracted downwardly, a fuel outlet pipe, a pipe for supplying a gaseous medium into the receptacle, said pipe extending from the outside of the receptacle through the wall to the interior thereof, the receiving mouth of said fuel outlet pipe being faced downward, the discharge part of the gas supply pipe projecting upward through the bottom of the receptacle which is contracted downwardly, and the top of said discharge part being formed as a cone having a plurality of discharge openings distributed on its whole periphery.

5. In a feeding device for pulverulent fuel in locomotives, the combination of a furnace, a tender provided with a powder receptacle contracted downwardly, a fuel outlet pipe extending between said receptacle and the furnace of the locomotive, a pipe for supplying a gaseous medium into the receptacle, the adjacent ends of said two pipes being located in the lower part of the receptacle but at some distance above the bottom of the receptacle, the receiving mouth of said fuel outlet pipe being faced downward, one of the adjacent ends of said two pipes being adjustable by means of a handle which is mechanically connected with said adjustable end and is conveniently accessible from the locomotive cabin, means for preventing the essential part of the gaseous medium, for feeding the fuel from the receptacle through the fuel outlet pipe, from passing in a straight line from the outlet of the gas supply pipe to the receiving mouth of the fuel outlet pipe.

6. In a feeding device for pulverulent fuel, a powder receptacle which is closed at the top and contracted downward, a fuel outlet pipe, having its receiving mouth faced downward, a pipe for supplying a gaseous medium into the receptacle, said latter pipe extending from a blowing machine through the bottom of the receptacle so as to deliver the gaseous medium below the said fuel receiving mouth, the discharge end of the gas supply pipe being slidably mounted in the bottom of the receptacle and having an outlet at its upper end which causes the gaseous medium to flow out substantially laterally, the said slidable discharge end being mechanically connected with a handle located at the outside of the receptacle at a higher point than the bottom of the receptacle.

7. In a feeding device for pulverulent fuel, a powder receptacle, a fuel outlet pipe, a pipe for supplying a gaseous medium into the receptacle, said pipe extending from the outside of the receptacle through the wall to the interior thereof, the receiving mouth of said fuel pipe being faced downward, said mouth and the outlet of the air supply pipe being spaced from each other, so that there will exist a mixing chamber for the gaseous medium and the fuel below the said receiving mouth, the outlet of the gas supply pipe being formed by a plurality of gas discharge openings lying at different heights in the receptacle, the receptacle being contracted downward and having the adjacent pipe ends located in the lower part but at some distance from the bottom of receptacle.

8. In a feeding device for pulverulent fuel, a powder receptacle, a fuel outlet pipe, a pipe for supplying a gaseous medium into the receptacle, said pipe extending from the outside of the receptacle through the wall to the interior thereof, the receiving mouth of said fuel pipe being faced downward, said mouth and the outlet of the air supply pipe being spaced from each other so that there will exist a mixing chamber for the gaseous medium and the fuel below the said receiving mouth, the outlet of the gas supply pipe being formed by a plurality of gas discharge openings lying at different heights in the receptacle, the receptacle being contracted downward and having the adjacent pipe ends located in the lower part but at some distance from the bottom of receptacle, one of the adjacent ends of said two pipes being adjustably mounted.

In testimony whereof I affix my signature in presence of two witnesses.

KARL HJALMAR VILHELM von PORAT.

Witnesses:
GUSTAF AOLF ALSON,
GRETA PRIM.